United States Patent [19]

Peterson et al.

[11] Patent Number: 4,729,706
[45] Date of Patent: Mar. 8, 1988

[54] FASTENER CLIP

[75] Inventors: Francis C. Peterson, Woodbury; Phillip D. Becker, Southbury, both of Conn.

[73] Assignee: Buell Industries, Inc., Waterbury, Conn.

[21] Appl. No.: 33,175

[22] Filed: Apr. 1, 1987

[51] Int. Cl.⁴ .............................................. F16B 37/02
[52] U.S. Cl. ..................... 411/175; 411/174; 411/112; 411/523
[58] Field of Search ............... 411/174, 175, 111, 112, 411/523, 524

[56] References Cited

U.S. PATENT DOCUMENTS

| | | | |
|---|---|---|---|
| 3,229,743 | 1/1966 | Derby | 411/175 |
| 3,426,818 | 2/1969 | Derby | 411/175 |
| 4,396,326 | 8/1983 | McKinnie et al. | 411/175 X |
| 4,408,939 | 10/1983 | Graff et al. | 411/174 X |
| 4,508,477 | 4/1985 | Oehlke et al. | 411/174 |

FOREIGN PATENT DOCUMENTS 2515301  11/1975  Fed. Rep. of Germany ...... 411/523

Primary Examiner—Robert L. Wolfe
Assistant Examiner—Suzanne L. Dino
Attorney, Agent, or Firm—St. Onge Steward Johnston & Reens

[57] ABSTRACT

A fastener clip is adapted to be pushed onto an edge of sheet materials of varying thicknesses. The clip has two legs. The first leg has a U-shaped elongated tongue cut from it and bent towards the second leg to frictionally engage a sheet material disposed between the two legs; the second leg has an integral threaded barrel for receiving a bolt. The U-shaped tongue is formed with offset bends to allow the tongue to yield when the clip is mounted on a thick sheet material.

6 Claims, 5 Drawing Figures

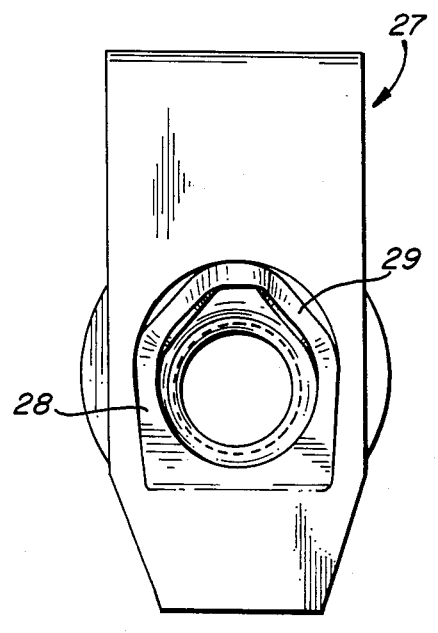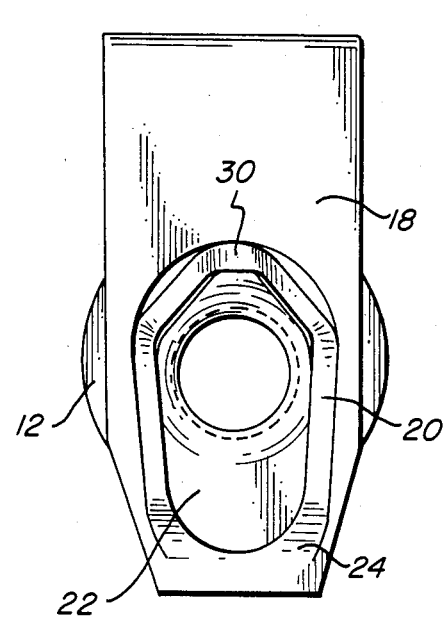

FASTENER CLIP

FIELD OF THE INVENTION

The present invention relates to an improved fastener clip which will frictionally mount on a sheet material and which is used in securing an object to a sheet material.

DESCRIPTION OF THE PRIOR ART

A fastener clip currently used in the automotive industry for securing objects to metal and plastic sheet materials is a clip with two legs between which the sheet material is disposed and which is secured by a threaded bolt. Typically, one leg frictionally engages the sheet and on the second leg of the clip there is an integral barrel which serves as a nut. This known fastener clip is shown at FIG. 5.

Such clips are useful for fastening objects to sheet materials where it would be difficult or impossible to hold a nut in place behind the sheet material to receive the bolt. The use of such a clip allows the barrel to be easily placed in a particular location and then secured with a threaded bolt, thus reducing the need to hold a nut in place behind the sheet material while the bolt is threaded into it.

This known fastener clip is adapted to be pushed onto an edge of a sheet material so that the first leg of the clip is on one side of the sheet material and the second leg is on the other side of the sheet. A D-shaped tongue is cut from the first leg and bent towards the other so as to frictionally engage a sheet onto which the clip is pushed. The D-shaped tongue has a circular hole punched in it. The D-shaped tongue is connected to the first leg of the fastener clip for the complete width of its root, which is the upright on the left side of the "D".

The second leg of the known fastener clip has an integral internally threaded barrel for receiving a threaded bolt. An object may be fastened to a sheet material by inserting a threaded bolt fastener through the circular hole in the D-shaped tongue and the sheet material, and into the threaded barrel.

It has been found that the prior art fastener clip suffers several practical drawbacks when used with sheet materials of varying thickness. When uesd on thinner sheets of approximately 0.030 inches in thickness, the prior art fastener clip can be mounted with a reasonable effort; however, mounting the clip on thicker sheets such as 0.157 inch plastic is difficult, as it requires a high degree of effort to push the clip onto the sheet.

SUMMARY OF THE INVENTION

The object of the present invention is to provide a fastener clip which is adapted for use with a range of material thicknesses, and which is free from the drawbacks encountered with the prior art fastener clip. More particularly, the present invention provides an improved fastener clip structure that is easily mounted and which provides a more consistent clamping force over a wide range of sheet material thicknesses.

These objects, and other objects which will become apparent from the description which follows, are achieved by a device in accordance with the invention, which comprises a fastener clip of the type wherein a clip has two legs disposed on either side of a flat material, the first leg having a U-shaped tongue formed thereon and the second leg having an outwardly protruding internally threaded barrel for receiving a fastener. The U-shaped tongue is attached to the first leg by the tips of the "U" and is formed by punching an oblong hole instead of the circular hole of the prior art. The U-shaped tongue is bent towards the second leg so as to frictionally engage the surface of a flat material and clamp the clip to the flat material. The tongue has an elongated spring arm that provides an even degree of clamping force on materials disposed between the clip fingers yet yields easily to allow the clip to be mounted on materials of varying thicknesses. The adaptability of the fastener clip of the present invention to a variety of sheet thicknesses is enhanced by providing a first offset bend in the arms of the U-shaped tongue which provides for easier yielding of the tongue when sheet materials are disposed between the legs of the clip.

BRIEF DESCRIPTION OF THE DRAWINGS

FIG. 3 is a plan view of a fastener clip in accordance with this invention.

FIG. 5 is a plan view of the prior art fastener clip.

DETAILED DESCRIPTION OF THE INVENTION

The invention will now be illustrated further with respect to the drawings.

Figure 1:
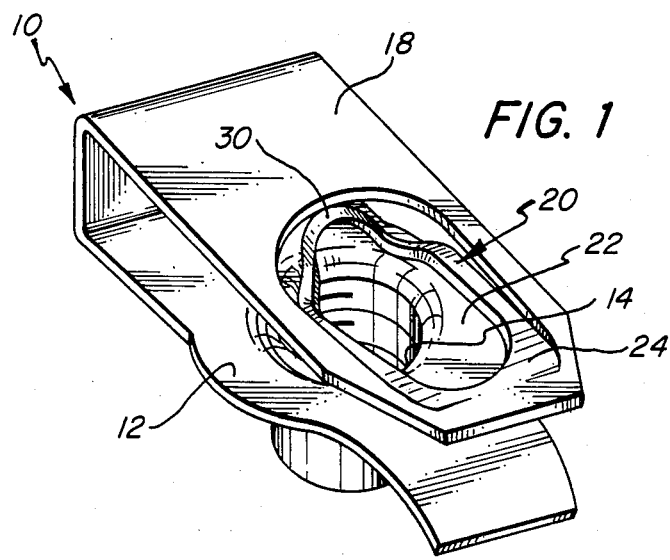
FIG. 1 is a perspective view of a fastener clip in accordance with this invention.
Figure 2:
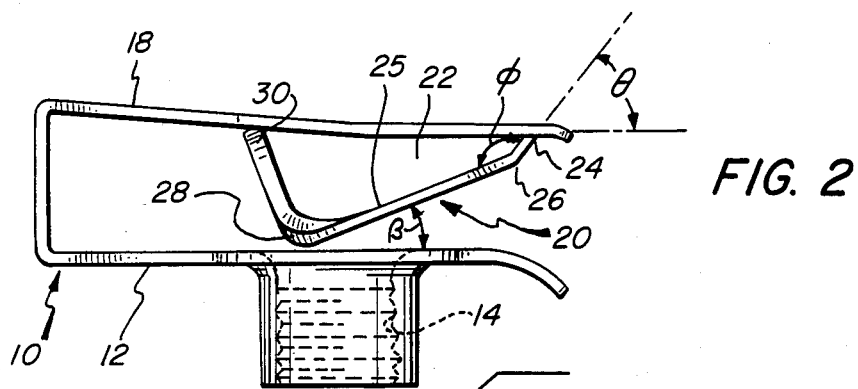
FIG. 2 is a side elevation view of a fastener clip in accordance with this invention.
Figure 4:
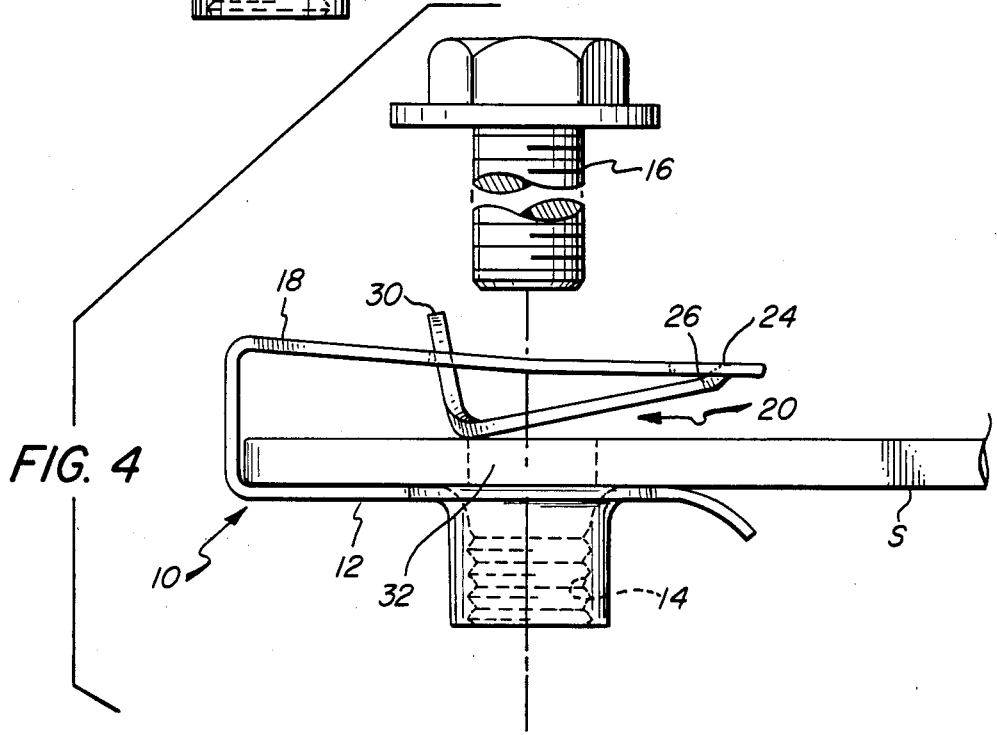
FIG. 4 is a side elevational view of a fastener clip with a sheet material disposed between its legs.

With reference to FIGS. 1, 2, 3 and 4 a fastener clip 10 is shown. The clip 10 is formed in a manner as is well known by stamping from a metal sheet such as steel or aluminum. Clip 10 includes a first leg 18 which has punched from it a tongue 20. Tongue 20, as seen in FIG. 3, is generally U-shaped and is connected to first leg 18 at the tips 24 of the U shape. Tips 24 act as an attachment point for the tongue. Tongue 20 may be formed by punching an oblong or elongate hole 22 in a solid tongue. Tongue 20 of the present invention, in comparison with the prior art clip shown in FIG. 5, is elongated. Tongue 20, as seen in FIG. 2, is bent or angled towards the leg 12 such that it can frictionally engage a material inserted between legs 18 and 12 of the clip 10. Typically, tongue 20 has an offset bend 26 located between the tips 24 and the straight portion 25. The offset bend 26 is provided so that Tongue 20 may more easily yield when the clip 10 is mounted on a sheet material. In the preferred embodiment, the angle $\theta$ between the leg 18 and the tongue 20 at the tips 24 is 45°, although a range from 0° to 90° can also be used. The angle $\phi$ of the offset bend 26 between the tip portion 24 of the Tongue 20 and the straight portion 25 of tongue 20 is optimally 150°, but a range of 105° to 195° can be used, such that the angle $\beta$ between the tongue 20 and the leg 12 is approximately 15°. Clip 10 also includes a second leg 12 with an integral internally threaded barrel 14 designed to receive a threaded fastener 16, as shown in FIG. 4.

Tongue 20 is adapted to yield upwardly towards leg 12 when a sheet is placed between the clip legs 12 and 18, as shown in FIG. 4. In contrast to the prior art clip shown in FIG. 5 as 27 which has a tongue connected to a leg along the entire width of the tongue root 28, the clip of the present invention has a tongue connected by two points at the tips 24 of the U-shape. The tips 24 act to reduce the push necessary to mount the clip because they form the roots of the U-shaped tongue 20, and are narrow metal strips which give a long, uniform spring arm. Thus, the tongue yields more easily than the D-shaped tongue of the prior art which is connected along the entire length of one side of the "D", much in the same way that less effort is required to bend a wire than a sheet of equal thickness. Thus, less force is required to push the tongue upwardly.

A reduced level of effort for mounting the clip is also attributable to the offset bends 26, which also contribute to the ease with which the tongue yields upwardly when the clip is mounted on a sheet material.

It is also to be appreciated that a fastener clip of the present invention is also made easier to mount than the prior art clip because of the effect of the lengthened spring arm formed by the elongated U-shaped tongue 20 as well as the configuration of the bends 26 in the tongue.

Tongue 20 has a further bend 28 where tongue 20 is adjacent to leg 12 such that the tongue tip 30 is pointed back towards the leg 18. As can be seen in FIG. 4, bend 28 allows the tongue to ride up on a sheet material when the clip is mounted and the tip 30 passes through the opening formed by punching out tongue 20.

FIG. 4 illustrates the fastener clip configured for use with a threaded fastener 16. As shown in FIG. 4, a sheet material S is inserted between the legs of the clip 10 and the clip is held in place by the frictional effect of tongue 20 pressed against the sheet material. Typically, an object to be fastened to the sheet material would be placed on finger 12 and secured by the fastener 16. The fastener 16 is inserted through an opening in the object, into the hole 22 and the hole 32 in sheet S, and is secured by threading it into the barrel 14.

The use of the improved fastener clip 10 with the tongue 20 reduces the amount of force necessary to mount the clip 10 to sheet material S. Testing has shown that the force necessary to push the prior art clip onto a sheet 0.147 inches in thickness is approximately 30 lbs. The clip of the present invention may be mounted with approximately 12-15 lbs. of push. The reduced mounting effort makes the improved fastener clip preferable to the prior art devices when used in an assembly line.

What is claimed is:

1. In a fastener assembly of the type where a clip having two legs is adapted to be pushed onto an edge of a sheet material, said clip having a tongue formed on a first leg for frictionally engaging said sheet material and having on a second leg an internally threaded barrel, the improvement wherein said tongue comprises: a U-shaped elongated tongue formation, with an oblong aperture therein, attached to said first leg at two points at the tips of said U-shape.

2. A fastener assembly in accordance with claim 1 wherein said U-shaped tongue is formed by punching an oblong hole in a solid tongue.

3. A fastener assembly comprising: a clip having two legs, said clip having an elongated tongue, with an oblong aperture therein, formed on a first leg for frictionally engaging a sheet material, said tongue being U-shaped and being attached to said first leg at two points at the tips of said U-shape and having offset bends formed adjacent to said two tips, and a second leg having an internally threaded barrel formed thereon.

4. A fastener assembly in accordance with claim 3 wherein said offset bends have an angle of between 105° and 195°.

5. A fastener assembly in accordance with claim 3 wherein said offset bends have an angle of about 150°.

6. A fastener assembly in accordance with claim 3 wherein the angle between said tongue and said second leg is about 15°.

* * * * *

REEXAMINATION CERTIFICATE (1779th)
United States Patent [19]
Peterson et al.

[11] B1 4,729,706
[45] Certificate Issued Aug. 25, 1992

[54] FASTENER CLIP

[75] Inventors: Francis C. Peterson, Woodbury; Phillip D. Becker, Southbury, both of Conn.

[73] Assignee: Buell Industries, Inc., Waterbury, Conn.

Reexamination Request:
No. 90/001,803, Jun. 28, 1989

Reexamination Certificate for:
Patent No.: 4,729,706
Issued: Mar. 8, 1988
Appl. No.: 33,175
Filed: Apr. 1, 1987

[51] Int. Cl.⁵ ............... F16B 37/02; F16B 37/04
[52] U.S. Cl. ............... 411/175; 411/174; 411/112; 411/523
[58] Field of Search ............... 411/111, 112, 172–175, 411/523, 524

[56] References Cited
U.S. PATENT DOCUMENTS
4,243,086  1/1981  Kuttler et al. ............... 411/174

*Primary Examiner*—Gary L. Smith

[57] ABSTRACT

A fastener clip is adapted to be pushed onto an edge of sheet materials of varying thicknesses. The clip has two legs. The first leg has a U-shaped elongated tongue cut from it and bent towards the second leg to frictionally engage a sheet material disposed between the two legs; the second leg has an integral threaded barrel for receiving a bolt. The U-shaped tongue is formed with offset bends to allow the tongue to yield when the clip is mounted on a thick sheet material.

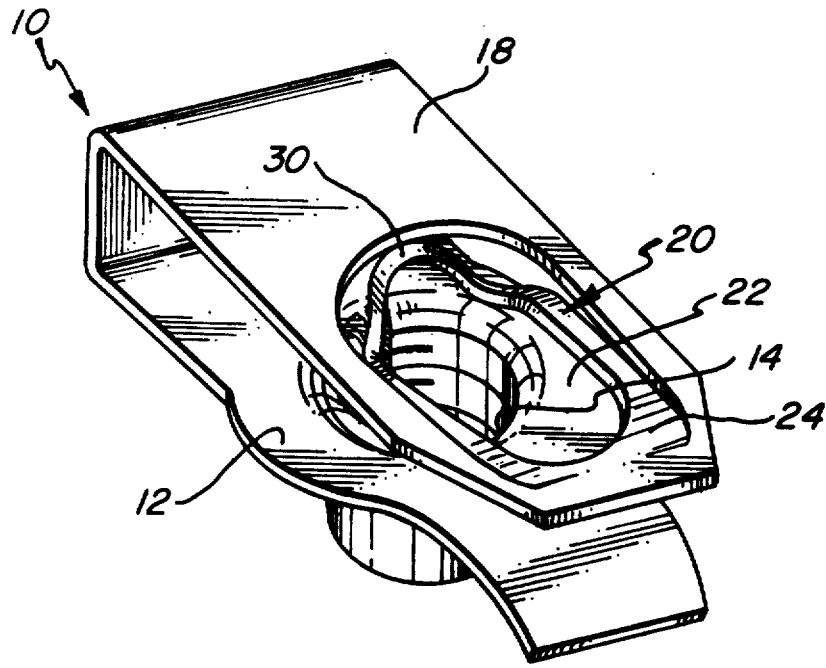

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3 and 6 are cancelled.

Claims 4 and 5 are determined to be patentable as amended.

New claims 7–18 are added and determined to be patentable.

4. A fastener assembly [in accordance with claim 3 wherein] *comprising: a clip having two legs, said clip having an elongated tongue having long substantially straight uniform spring arms, with an elongated oblong aperture therein, formed with close clearance from a first leg for frictionally engaging a sheet material, said tongue being U-shaped and being attached to said first leg at two points at the tips of said U-shape and having offset bends formed adjacent said two tips,* said offset bends [have] *having* an angle of between 105° and 195°, *and a second leg having an internally threaded barrel formed thereon.*

5. A fastener assembly [in accordance with claim 3 wherein] *comprising: a clip having two legs, said clip having an elongated tongue having long substantially straight uniform spring arms, with an elongated oblong aperture therein, formed with close clearance from a first leg for frictionally engaging a sheet material, said tongue being U-shaped and being attached to said first leg at two points at the tips of said U-shape and having offset bends formed adjacent said two tips,* said offset bends [have] *having* an angle of about 150°, *and a second leg having an internally threaded barrel formed thereon.*

7. *A fastener assembly, comprising: a clip having first and second legs,*
   *(a) said first leg having a substantially U-shaped elongated tongue for engaging a sheet material,*
   *(i) said tongue having long uniform spring arms formed of substantially straight metal strips connected to said first leg at tips of said strips, said arms having offset bends adjacent said tips of said strips, said offset bends having an angle of between 105° and 195°,*
   *(ii) said tongue being formed with close clearance from said first leg;*
   *(iii) a substantially elongated oblong aperture being provided in said tongue; and*
   *(b) said second leg having a threaded barrel having a central axis therethrough, for receiving a threaded fastener formed thereon.*

8. *A fastener assembly in accordance with claim 7 wherein said clip may be pushed onto a sheet material having a thickness of 0.147 inches with between about 12 to about 15 pounds of force.*

9. *A fastener assembly in accordance with claim 7 wherein said spring arms are sufficiently elongated whereby they extend for a substantial distance away from said axis of said threaded barrel, whereby said fastener assembly may be mounted onto sheet materials having a substantial range of material thicknesses with a push-on force of less than about 15 pounds.*

10. *A fastener assembly in accordance with claim 9 wherein said tongue is formed from said first leg with close clearance between said tongue and said first leg when said tongue and first leg are located in the same plane.*

11. *A fastener assembly in accordance with claim 10 wherein the angle between said tongue and said second leg is about 15°.*

12. *A fastener assembly in accordance with claim 7 wherein said offset bends have an angle of about 150°.*

13. *A fastener assembly in accordance with claim 7 wherein an angle between said first leg and said tongue is between about 0 to about 90 degrees.*

14. *A fastener assembly comprising: a clip having two legs, said clip having an elongated tongue having long substantially straight uniform spring arms, with an elongated oblong aperture therein, formed with close clearance from a first leg for frictionally engaging a sheet material, said tongue being U-shaped and being attached to said first leg at two points at the tips of said U-shape and having offset bends formed adjacent said two tips, said offset bends having an angle of between 105° and 195°, and a second leg having an internally threaded barrel formed thereon.*

15. *A fastener assembly in accordance with claim 14 wherein said offset bends have an angle of about 150°.*

16. *A fastener assembly in accordance with claim 14 wherein the angle between said tongue and said second leg is about 15°.*

17. *A fastener assembly comprising: a clip having two legs, said clip having an elongated tongue having long substantially straight uniform spring arms, with an elongated oblong aperture therein, formed with close clearance from a first leg for frictionally engaging a sheet material, said tongue being U-shaped and being attached to said first leg at two points at the tips of said U-shape and having offset bends formed adjacent said two tips, and a second leg having an internally threaded barrel formed thereon, the angle between said tongue and said second leg being about 15°.*

18. *A fastener assembly in accordance with claim 17 wherein said offset bends have an angle of between 105° and 195°.*

* * * * *